United States Patent
Koskinen (10) Patent No.: US 10,159,034 B2
(45) Date of Patent: Dec. 18, 2018

(54) IMPROVING MULTIMEDIA BROADCAST SERVICE EFFICIENCY

(71) Applicant: Nokia Solutions and Networks Oy, Espoo (FI)

(72) Inventor: Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 161 days.

(21) Appl. No.: 15/306,871

(22) PCT Filed: May 8, 2014

(86) PCT No.: PCT/EP2014/059451
§ 371 (c)(1),
(2) Date: Oct. 26, 2016

(87) PCT Pub. No.: WO2015/169371
PCT Pub. Date: Nov. 12, 2015

(65) Prior Publication Data
US 2017/0048893 A1    Feb. 16, 2017

(51) Int. Cl.
*H04W 4/06* (2009.01)
*H04L 29/06* (2006.01)
(Continued)

(52) U.S. Cl.
CPC ......... *H04W 48/10* (2013.01); *H04L 65/4076* (2013.01); *H04W 4/06* (2013.01); *H04W 36/0007* (2018.08); *H04W 76/40* (2018.02)

(58) Field of Classification Search
CPC ............... H04W 76/002; H04W 76/40; H04W 65/4076; H04W 4/06; H04W 36/0005; H04W 48/10
See application file for complete search history.

(56) References Cited

U.S. PATENT DOCUMENTS 8,811,253 B2 * 8/2014 Damnjanovic ..... H04W 72/005
370/312
2009/0316615 A1 * 12/2009 Vedantham ........... H04W 36/02
370/312
(Continued)

FOREIGN PATENT DOCUMENTS

CN      102761829 A    10/2012
KR     2012-0123914 A  11/2012

OTHER PUBLICATIONS

"3rd Generation Partnership Project; Technical Specification Group Radio Access Network; Evolved Universal Terrestrial Radio Access (E-UTRA); Study on Group Communication for E-UTRA (Release 12)", 3GPP TR 36.868, V1.0.0, Nov. 2013, pp. 1-16.
(Continued)

*Primary Examiner* — Afsar M Qureshi
(74) *Attorney, Agent, or Firm* — Harrington & Smith (57) ABSTRACT

This document discloses a solution of maintaining service continuity in a multimedia broadcast service provided by a cellular network in a multimedia broadcast service area. A base station may transmit, in at least one cell provided by the base station, control information comprising an information element, wherein the information element may comprise an identifier of the multimedia broadcast service area and an indication that may cause at least one terminal device located in the at least one cell to request the multimedia broadcast service content as a transmission addressed to the at least one terminal device. The at least one terminal device may receive the control information comprising the information element that may cause the at least one terminal device to request the multimedia broadcast service content as the transmission addressed to the at least one terminal device.

20 Claims, 6 Drawing Sheets

(51) Int. Cl.
*H04W 36/00* (2009.01)
*H04W 48/10* (2009.01)
*H04W 76/40* (2018.01)

(56) References Cited

U.S. PATENT DOCUMENTS

| | | | |
|---|---|---|---|
| 2013/0044668 A1* | 2/2013 | Purnadi | H04W 36/0055 370/312 |
| 2014/0036676 A1* | 2/2014 | Purnadi | H04W 36/0055 370/235 |
| 2015/0055541 A1* | 2/2015 | Zhang | H04W 72/005 370/312 |
| 2016/0255610 A1* | 9/2016 | Li | H04B 7/0413 370/329 |

OTHER PUBLICATIONS

"New SI Proposal: Group Communication for LTE", TSG RAN meeting #61, RP-131382, Alcatel-Lucent, Sep. 3-6, 2013, 06 pages.

"Agreements From TSG RAN on Work on Public Safety Related Use Cases in Release 12", TSG RAN Meeting #61, RP-131377, Agenda: 13.1, Vodafone, Sep. 3-6, 2013, pp. 1-6.

"LS on Agreements From TSG RAN on Work on Public Safety Related Use Cases in Release 12", 3GPP TSG RAN Meeting #61, RP-131405, TSG RAN, Sep. 3-6, 2013, 01 page.

"3rd Generation Partnership Project;Technical Specification Group Radio Access Network;Evolved Universal Terrestrial Radio Access (E-UTRA);Study on Group Communication for E-UTRA(Release 12)", 3GPP TR 36.868, V1.1.0, Feb. 2014, pp. 1-20.

"3rd Generation Partnership Project;Technical Specification Group Radio Access Network;Evolved Universal Terrestrial Radio Access (E-UTRA); User Equipment (UE) procedures in idle mode(Release 11)", 3GPP TS 36.304, V11.6.0, Dec. 2013, pp. 1-34.

"3rd Generation Partnership Project;Technical Specification Group Radio Access Network;Evolved Universal Terrestrial Radio Access (E-UTRA);Radio Resource Control (RRC);Protocol specification(Release 12)", 3GPP TS 36.331, V12.0.0, Dec. 2013, pp. 1-349.

"3rd Generation Partnership Project; Technical Specification Group Radio Access Network; Evolved Universal Terrestrial Radio Access (E-UTRA); Physical channels and modulation (Release 12)", 3GPP TS 36.211, V12.0.0, Dec. 2013, pp. 1-120.

International Search Report and Written Opinion received for corresponding Patent Cooperation Treaty Application No. PCT/EP2014/059451, dated Jan. 26, 2015, 12 pages.

"RAN3 Topics to Complete MBMS Service Continuity feature", 3GPP TSG-RAN WG3 Meeting #76, R3-121047, Agenda: 18, Alcatel-Lucent, May 21-25, 2012, pp. 1-2.

* cited by examiner

IMPROVING MULTIMEDIA BROADCAST SERVICE EFFICIENCY

RELATED APPLICATION

This application was originally filed as PCT Application No. PCT/EP2014/059451 filed May 8, 2014.

FIELD

The present invention relates generally to the use of multimedia broadcasting service (MBS). More particularly, the present invention relates to maintaining service continuity of the MBS provided by a cellular network in a MBS area especially on the edges of the MBS area.

BACKGROUND

In recent years, mobile broadcast solutions have been standardized by different organizations, such as the 3rd Generation Partnership Project (3GPP) Multimedia Broadcast Multicast Service (MBMS). 3GPP MBMS may enable resource-efficient delivery of multimedia content to the mobile users. A MBMS client may receive content via download delivery, streaming delivery, a combination of streaming delivery and download delivery, and/or other delivery methods.

BRIEF DESCRIPTION

The invention is defined by the independent claims.

According to an aspect, there is provided an apparatus comprising means for carrying out all the steps of the method according to any one of the appended claims.

According to an aspect, there is provided a computer program product embodied on a distribution medium readable by a computer and comprising program instructions which, when loaded into an apparatus, execute the method according to any one of the appended claims.

Embodiments of the invention are defined in the dependent claims.

BRIEF DESCRIPTION OF THE DRAWINGS

In the following the invention will be described in greater detail by means of preferred embodiments with reference to the attached drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G sys-tem.

Figure 1:
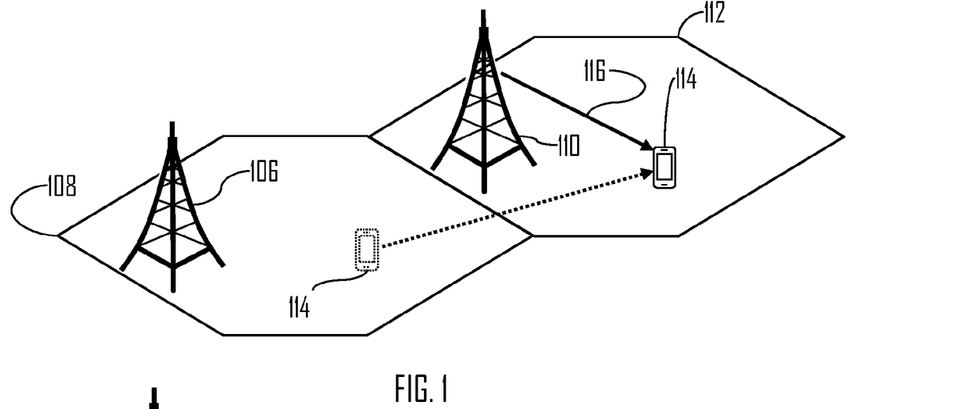
FIG. 1 illustrates general wireless communication system scenario to which embodiments of the invention may be applied.

A general wireless communication system scenario to which embodiments communication system comprising a base station 106 providing a cell 108, another base station 110 providing a cell 112 and a terminal device 114. The base stations 106, 110 may be capable of providing Multimedia Broadcast Service (MBS), such as Multimedia Broadcast/Multicast Service (MBMS) for example, in the cells 108, 112. The terminal device may receive a multimedia broadcast from the base station 106 when the terminal device is inside the cell 108. The multimedia broadcast may be carried out, for example, by a MBMS Point-To-Multipoint Radio Bearer (MRB). The cells 108, 112 may be a part of a MBS area providing MBS, wherein the cell 112 may be an edge cell of the MBS area or a cell in which the MBS is provided by a unicast transmission. The edge cell of the MBS area may mean that area(s) farther than the cell 112 are not part of the MBS area, excluding the area of cell 108. It may also mean that although area(s) outside the cell 112 are part of the MBS area, they may not provide MBS. Such areas may be, for example, cell(s) within the MBS area which are not allowed to transmit MBS. In an embodiment, the cell(s) within the MBS area which are not allowed to transmit MBS may be MBS area reserved cell(s).

The terminal device 114 may physically move from the cell 108 to the cell 112. In the cell 112, the terminal device 114 may receive content broadcast from the base station 110 in the cell 112, similarly as the terminal device 114 may receive broadcast from the base station 106 in the cell 108. The terminal device 114 may also request the broadcast content from the base station 110 as a unicast transmission 116. The unicast transmission 116 may be used to, for example, ensure broadcast continuity as the terminal device may further move outside the cell 112. MBS may be, for example, a Multimedia Broadcast/Multicast Service (MBMS) and the cellular network in the MBS area may apply, for example, a Multimedia Broadcast Single Frequency Network (MBSFN).

In an embodiment, the MBS area comprises a MBSFN area.

In an embodiment, the MBS area is a MBSFN area.

The MBMS may apply two network channels for operation: a Multicast Control Channel (MCCH) and a Multicast Traffic Channel (MTCH). The MCCH may provide necessary control information for terminal devices to receive MBMS, whereas the MTCH may be used to transmit the actual media content to the terminal devices. Referring to FIG. 1, the base stations 106, 110 providing the cells 108, 112, respectively, may transmit system information, such as System Information Block Type 13 (SIB13). The multimedia transmission may comprise information from MCCH and MTCH which are mapped to, for example, Multicast Channel (MCH). The SIB13 may comprise information for the terminal devices for acquiring the MBMS control information, transmitted for example via the MCCH, associated with one or more MBS areas. Also other information elements may be used to transmit the control information to the terminal device.

A terminal device may also determine by the absence of system information, such as SIB13, that the MBS is not available. The terminal device may then request a unicast transmission. There may be also cells inside MBS area, in which the MBS transmission is restricted to reduce interference to other cells. This may mean that there may be areas inside the MBS area, which do not allow terminal devices to receive MBS.

The term "base station" may be node B (NB) as in the UMTS, evolved node B (eNB) as in the LTE, a radio network controller (RNC) as in the UMTS, a base station controller (BSC) as in the GSM/GERAN, or any other apparatus capable of controlling radio communication and managing radio resources within a cell.

Figure 2:
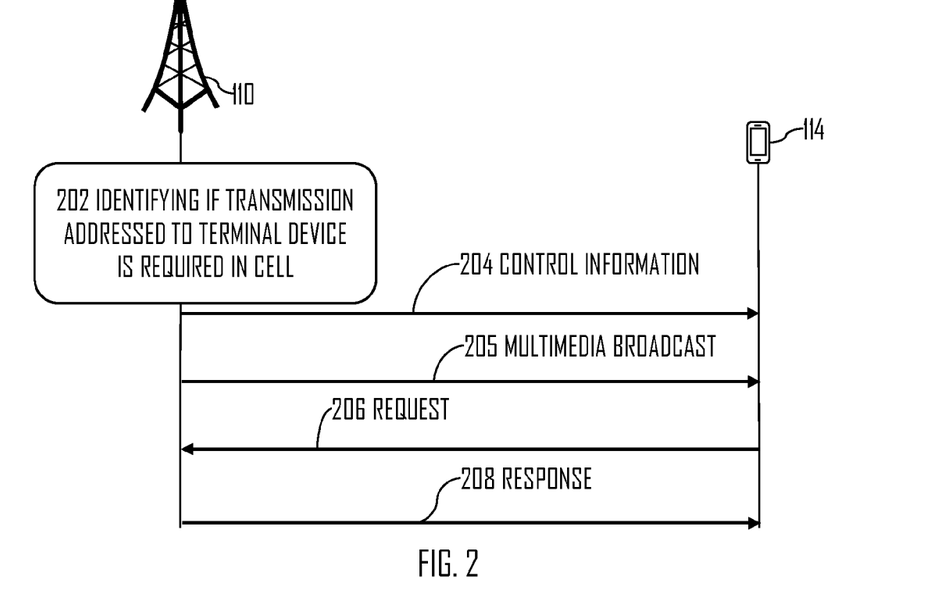
FIG. 2 illustrates a method of maintaining service continuity of a MBS provided by a cellular network in a MBS area according to an embodiment of the invention.

A method of maintaining service continuity of the MBS provided by a cellular network in the MBS area is proposed in FIG. 2. FIG. 2 illustrates information exchange between a base station 110 and a terminal device 114. The invention proposes to indicate to the terminal device 114, by sending control information, that the terminal device 114 should request the MBS content, from the base station 110, as a transmission addressed to the at least one terminal device. The base station 110 may provide the cell in which the terminal device is located in. In an embodiment, the terminal device 114 may be comprised in the cell provided by the base station 110. The base station 110, in step 202, may identify if the cell it is providing is a cell in which a transmission addressed to the at least one terminal device, such as terminal device 114, is required. Such a cell may be, for example, an edge cell of a cellular network in the MBS area or a MBS area reserved cell. The base station may know this as the base station may be aware of the MBS area configuration in the cellular network.

The base station 110 may transmit control information 204 comprising an information element. In an embodiment, the information element may be or comprise the SB13. The information element may also be transmitted via transmission addressed to the terminal device 114. The information element may comprise identifier of the MBS area and an indication that may cause the terminal device 114 to request the multimedia broadcast service content as a transmission addressed to the terminal device 114. The base station may further send other control information and the actual multimedia broadcast 205. The terminal device 114 may receive the transmitted information element, as well as the actual multimedia broadcast 205 from the base station 110.

At least partly because the terminal device 114 acquires knowledge that it is located in the cell in which the transmission addressed to the terminal device should be requested, the terminal device 114 may send a message 206 to the base station 110, wherein the message may comprise a request to the base station 110 to start sending the MBS content as a transmission addressed to the terminal device 114. In an embodiment, the transmission addressed to the terminal device 114 may be, for example, a unicast transmission.

The base station 110 may receive the message 206, sent by the terminal device 114. The base station 110 may, as a response to the message 206 sent by the terminal device 114, transmit the MBS content to the terminal device 114 as a transmission addressed to the terminal device 114. This is shown with an arrow 208 in FIG. 2.

In an embodiment, the terminal device 114 may continue receiving the multimedia broadcast 205 before, during and after sending the message 206. The base station 110 may thus continue sending the multimedia broadcast 205 as well as control information 204 before, during and after receiving the message 206.

It should be noted that although the following considers single-frequency network type of broadcast transmission, the embodiments may be applicable to other types as well. One type of information element sent in step 204 and required by the terminal device 114 to acquire MBMS control information associated with one or more MBSFN area is illustrated in FIG. 3.

Figure 3:
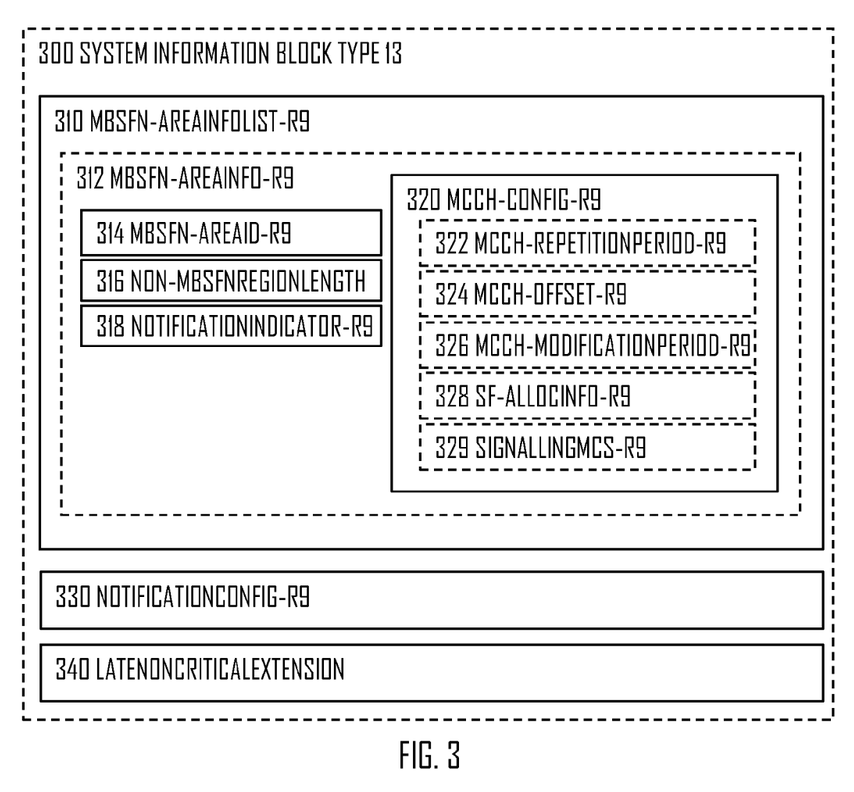
FIG. 3 illustrates information block content according to an embodiment of the invention.

The information element SIB13 300 may further comprise more information elements not illustrated in FIG. 3. The SIB13 300 may comprise an MbsfnAreaInfoList-r9 field 310, NotificationConfig-r9 field 330 and LateNonCriticalExtension field 340, for example. The field Mbsfn-AreaInfoList-r9 310 may further comprise Mbsfn-AreaInfo-r9 field 312. The Mbsfn-AreaInfo-r9 field 312 may comprise MbsfnAreaId-r9 field 314, Non-MbsfnRegionLength field 316, NotificationIndicator-r9 field 318 and Mcch-Config-r9 320. The Mbsfn-AreaId-r9 field 314 may be used to indicate to the terminal device 114 the MBFSN area in question. The Mcch-Config-r9 field 320 may comprise Mcch-RepetitionPeriod-r9 field 322, Mcch-Offset-r9 field 324, McchModificationPeriod-r9 field 326, Sf-AllocInfo-r9 328 and SignallingMcs-r9 field 329. Null allocation may be indicated in field Sf-AllocInfo-r9 328 by, for example, setting all the field bits to zero or setting field to a bitmap of all zeros.

In an embodiment of the invention, the Mbsfn-AreaId-r9 field 314 may be used as an identifier of the MBS area.

In an embodiment, the Sf-AllocInfo-r9 field 328 may be used as an indication that causes at least one terminal device comprised in the at least one cell to request the MBS content as a transmission addressed to the at least one terminal device by setting null allocation to the Sf-AllocInfo-r9 field 328.

In an embodiment, the Sf-AllocInfo-r9 field 328 may be used as an indication that the at least one cell is an edge cell of the MBS area by setting null allocation to the Sf-AllocInfo-r9 field 328.

In an embodiment, the null allocation may be established by setting all the Sf-AllocInfo-r9 field 328 bits to zero or setting the field to a bitmap of all zeros.

In an embodiment, the identifier of the MBS area is represented in the system information block's MBS area identifier. Looking at the example of FIG. 3, such identifier may be given in the Mbsfn-AreaId-r9 field 314.

In an embodiment of the invention, the indication that causes at least one terminal device comprised in the at least one cell to request the MBS content as a transmission addressed to the at least one terminal device may be implemented by setting, in the system information block, the multimedia broadcast service control channel allocation to indicate null allocation. Looking at the example of FIG. 3, such null allocation may be given in the Sf-AllocInfo-r9 field 328.

In an embodiment of the invention, the null allocation is carried out by setting the multimedia broadcast service control channel allocation field to a bitmap of all zeros. Looking at the example of FIG. 3, such null allocation may be given in the Sf-AllocInfo-r9 field 328 by setting all the bits in Sf-AllocInfo-r9 to zero. In an embodiment of the invention, at least one terminal device may receive an information element, such as SIB13, transmitted by at least one base station providing at least one cell that is an edge cell of a cellular network in the MBS area. The transmitted information element may indicate, for example, in the Mbsfn-Areald-r9 field the identifier of the MBSFN area in question. Under Mcch-Config-r9, a null allocation for the MCCH may be indicated by setting Sf-AllocInfo-r9 field to a bitmap of all zeros. This may leave legacy terminals no choice but to ignore the allocation. In an embodiment, if the field Mbsfn-Areald-r9 is included, then also all the other fields that follow as part of that information element must be included.

In an embodiment of the invention, if the SIB13 indicates the MbsfnAreald-r9 field of the MBSFN area providing the MRB, and if within the same MbsfAreaInfo-r9 all the bits of Sf-AllocInfo-r9 of Mcch-Config-r9 are set to zero or '0', the receiving terminal device may indicate to upper layers that delivery of the MBMS service by unicast should be requested, but may continue receiving the MRB.

Figure 4:
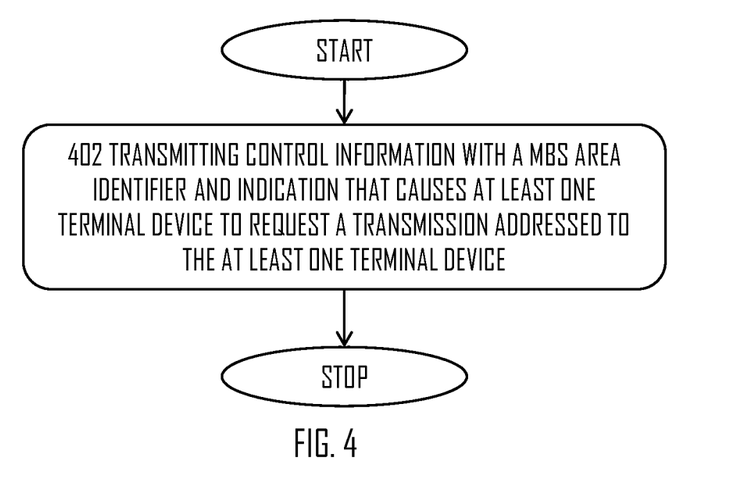
FIG. 4 illustrates a flow diagram according to an embodiment of the invention.

FIG. 4 illustrates a flowchart of maintaining service continuity in a multimedia broadcast service provided by a cellular network in a MBS area according to an embodiment of the invention. Referring to FIG. 4, in step 402, a base station providing at least one cell may transmit control information comprising an information element, wherein the information element may comprise an identifier of the MBS area and an indication that may cause at least one terminal device located in the at least one cell to request the MBS content as a transmission addressed to the at least one terminal device.

In an embodiment of the invention, the base station may further receive, from the at least one terminal device located in the at least one cell a message, wherein the message may comprise a request to start providing the multimedia broadcast service content as the transmission addressed to the at least one terminal device, and the base station may further transmit, as response to the received message the multimedia broadcast service content to the at least one terminal device as the transmission addressed to the at least one terminal device.

In an embodiment of the invention, the base station may further broadcast, in the at least one cell provided by the base station a multimedia broadcast transmission comprising the multimedia broadcast service content.

In an embodiment of the invention, the transmission addressed to the at least one terminal device may be a unicast transmission.

In an embodiment of the invention, the broadcasting of the multimedia broadcast transmission may be continued, while also performing the transmission addressed to the at least one terminal device.

In an embodiment of the invention, the indication that causes the at least one terminal device comprised in the at least one cell to request the multimedia broadcast service content as a transmission addressed to the at least one terminal device comprises an indication that the at least one cell may be an edge cell of the multimedia broadcast service area.

In an embodiment of the invention, the information element may comprise a system information block carrying information required to acquire multimedia broadcast service control information associated with one or more multimedia broadcast service areas.

In an embodiment of the invention, the identifier of the MBS area may be represented in the information element's multimedia broadcast service area identifier. In an embodiment of the invention, the indication that may cause the at least one terminal device comprised in the at least one cell to request the multimedia broadcast service content as a transmission addressed to the at least one terminal device may be carried out by setting, in the information element, a multimedia broadcast service control channel allocation to indicate null allocation.

In an embodiment of the invention, the null allocation may be carried out by setting the MBS control channel allocation field to a bitmap of all zeros.

In an embodiment of the invention, the MBS may be a MBMS and/or the MBS area may be a MBSFN area.

In an embodiment of the invention, the multimedia broadcast transmission may be carried out by a MRB(s).

In an embodiment of the invention, the at least one terminal device may be comprised in the at least one cell provided by the base station.

Figure 5:
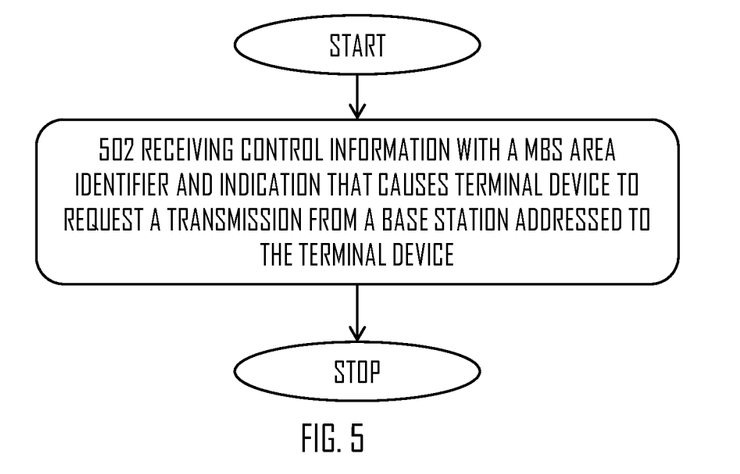
FIG. 5 illustrates a flow diagram according to an embodiment of the invention.

FIG. 5 illustrates a flowchart of maintaining service continuity in a multimedia broadcast service provided by a cellular network in a MBS area according to an embodiment of the invention. Referring to FIG. 5, in step 502, a terminal device in the cellular network may receive control information comprising an information element, wherein the information element may comprise an identifier of the multimedia broadcast service area and an indication that may cause the terminal device to request the multimedia broadcast service content as a transmission addressed to the terminal device.

In an embodiment of the invention, the terminal device in the cellular network may further send as a response to the said indication a message to at least one base station, wherein the message comprises a request to start providing the multimedia broadcast service content as a transmission addressed to the terminal device, and the terminal device in the cellular network may further receive as a response to the sent message the multimedia broadcast service content to the terminal device as the transmission addressed to the terminal device.

In an embodiment of the invention, the terminal device in the cellular network may further receive a multimedia broadcast transmission comprising the multimedia broadcast service content.

In an embodiment of the invention, the transmission addressed to the at least one terminal device is a unicast transmission.

In an embodiment of the invention, the terminal device in the cellular network may continue receiving the multimedia broadcast transmission, before receiving the transmission addressed to the at least one terminal device.

In an embodiment of the invention, the indication that causes the terminal device to request the multimedia broadcast service content as a transmission addressed to the terminal device may comprise an indication that a cell, provided by a base station, in which the terminal device is comprised in may be an edge cell of the multimedia broadcast service area.

In an embodiment, the indication may instruct the terminal device to request the multimedia broadcast service content as a transmission addressed to the terminal device.

In an embodiment, the multimedia broadcast service content may mean the content of the multimedia broadcast service.

Figure 6:
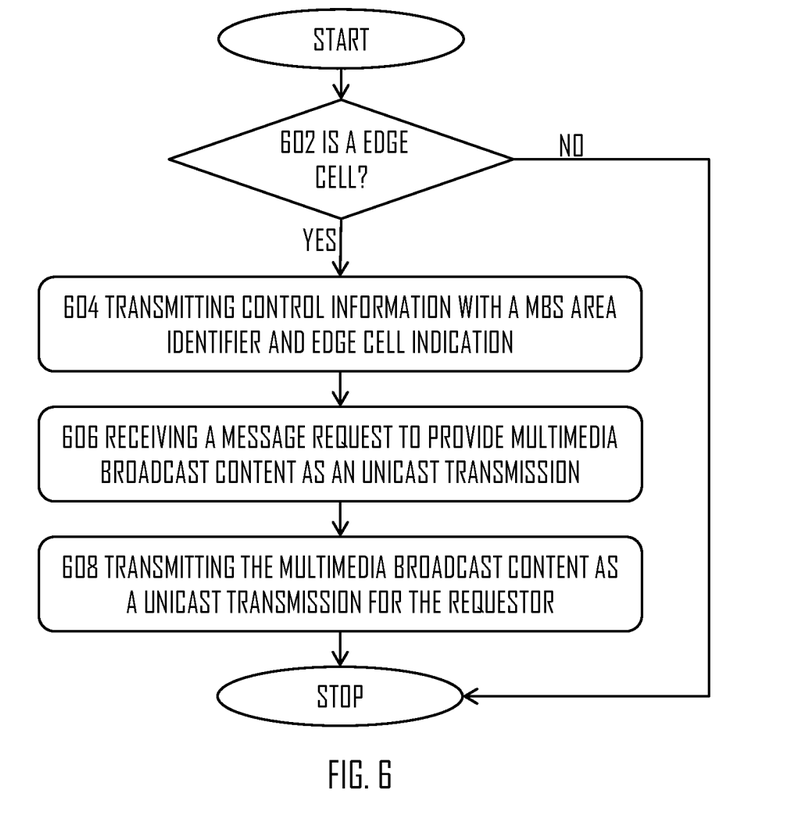
FIG. 6 illustrates a flow diagram of identifying an edge cell, transmitting multimedia broadcast, receiving a message request and transmitting a response transmission to the requestor according to an embodiment of the invention.

FIG. 6 illustrates a flow diagram of maintaining service continuity in a multimedia broadcast service provided by a cellular network in a MBS area according to an embodiment of the invention. In block 602, at least one base station of the cellular network may identify that the at least one cell provided by the at least one base station is an edge cell of the MBS area. If the at least one cell in question is an edge cell, the step 604 may follow. In step 604, control information comprising an information element may be transmitted by the at least one base station, wherein the information element may comprise an identifier of the MBS area of which the at least one cell may be a part of and an indication that the at least one cell may be an edge cell of the MBS area. In step 606, the at least one base station may receive, from at least one terminal device comprised in the at least one cell, a message, wherein the message may comprise a request to start providing the multimedia broadcast service content as a transmission addressed to the at least one terminal device. In step 608, the at least one base station may transmit, as response to the received message, the multimedia broadcast service content to the at least one terminal device as the transmission addressed to the at least one terminal device. In block 602, the least one base station of the cellular network may identify that the at least one cell provided by the at least one base station is not an edge cell of the MBS area. The at least one base station may continue its normal operation. The at least one base station may, for example, transmit a multimedia broadcast and a cell identifier and an indication that the at least one cell provided by the at least one base station is not an edge cell of the MBS area.

In an embodiment of the invention, at least one base station may receive, from at least one terminal device comprised in at least one cell provided by the at least one base station, a message, wherein the message may comprise a request to start providing the multimedia broadcast service content as a unicast transmission for the at least one terminal device. The at least one base station may transmit, as response to the received message, the multimedia broadcast service content to the at least one terminal device as a unicast transmission.

In an embodiment, at least one base station may transmit a multimedia broadcast transmission.

In an embodiment, at least one base station may continue transmitting the multimedia broadcast transmission after the at least one base station has received, from at least one terminal device comprised in at least one cell provided by the at least one base station, a message, wherein the message comprises a request to start providing the multimedia broadcast service content as a unicast transmission to the at least one terminal device or as a transmission addressed to the at least one terminal device. The base station may proceed to provide the unicast transmission to the at least one terminal device or as the transmission addressed to the at least one terminal device, in parallel with the continued broadcast transmission.

Figure 7:
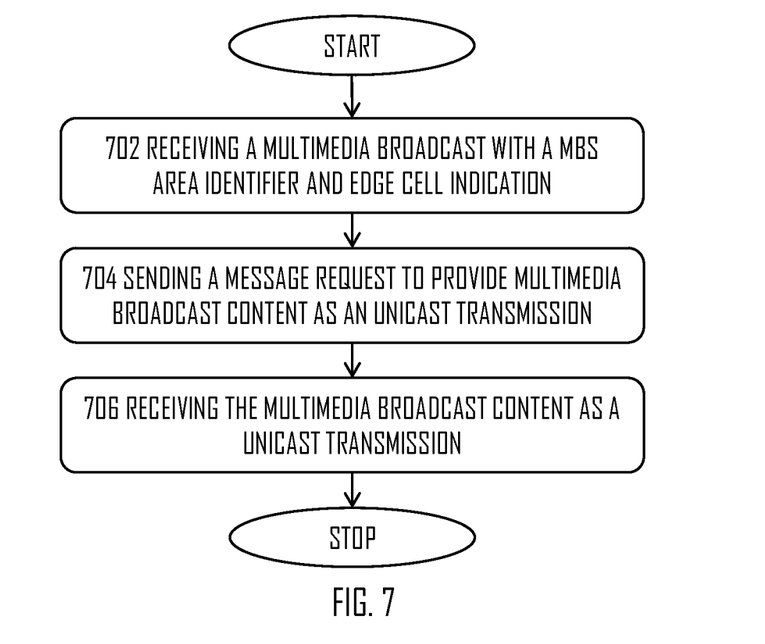
FIG. 7 illustrates a flow diagram of receiving a multimedia broadcast transmission, sending a message request and receiving response transmission according to an embodiment of the invention.

FIG. 7 illustrates a flow diagram of maintaining service continuity in a MBS provided by a cellular network in a MBS area according to an embodiment of the invention. In block 702, at least one terminal device comprised in the cellular network may receive control information comprising an information element, wherein the information element may comprise an identifier of the MBS area and an indication that the at least one cell is an edge cell of the MBS area. In block 704, the at least one terminal device comprised in the cellular network may send a message to at least one base station, wherein the message may comprise a request to start providing the multimedia broadcast service content as a transmission addressed to the at least one terminal device. In block 706, the at least one terminal device comprised in the cellular network may receive, as a response to the sent message, the multimedia broadcast service content to the at least one terminal device as the transmission addressed to the at least one terminal device.

In an embodiment of the invention, at least one terminal device comprised in the cellular network may send a message to the at least one base station, wherein the message comprises a request to start providing the multimedia broadcast service content as a unicast transmission for the at least one terminal device. The at least one terminal device may then receive the multimedia broadcast service content from the at least one base station as a unicast transmission.

In an embodiment, at least on terminal device may receive a multimedia broadcast transmission comprising multimedia broadcast service content.

In an embodiment of the invention, at least one terminal device comprised in the cellular network may send a message to the at least one base station, wherein the message comprises a request to start providing the multimedia broadcast service content as a unicast transmission for the at least one terminal device. The at least one terminal device may continue to receive the multimedia broadcast transmission and may receive the multimedia broadcast service content from the at least one base station as a unicast transmission, after the said continued receiving.

In an embodiment, the multimedia broadcast service content may comprise a multimedia broadcast transmission's content.

In an embodiment, the multimedia broadcast transmission may comprise control information.

In an embodiment, the MBS area identifier may comprise a cell identifier.

Figure 8:
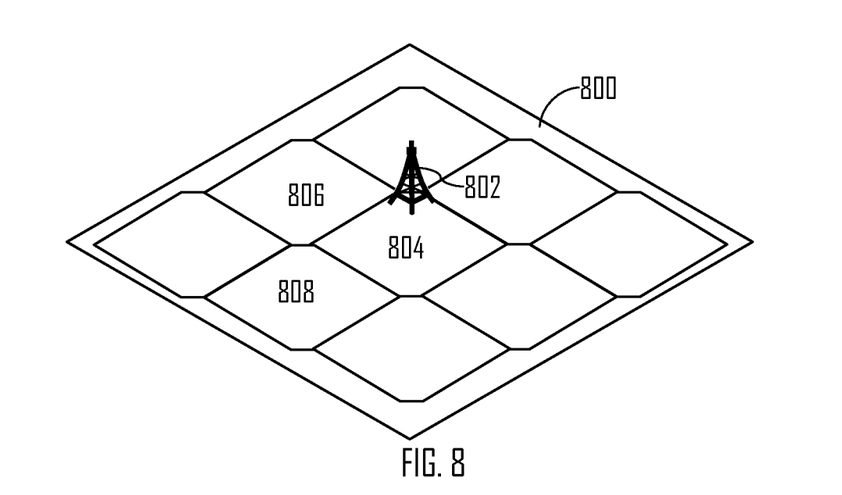
FIG. 8 illustrates scenario to which some embodiments of the invention may be applied.

FIG. 8 illustrates a scenario to which the embodiments of the invention may be applied. Referring to FIG. 8, a base station 802 may provide a cell 804. The cell 804 may be comprised in a MBS area 800. The MBS area may be, for example, a MBSFN area. A MBS, such as MBMS may be provided in the MBS area 800. The MBS area 800 may comprise more cells, such as cells 806, 808, provided by at least one base station. In an embodiment, at least some of the more cells may be provided by the base station 802. The cell 804 may not be an edge cell of the MBS area 800, but it may not broadcast the MBS content as it may be, for example, a MBS area reserved cell which may not be allowed to transmit MBS or to provide MBS. In an embodiment, the base station 802 may transmit control information comprising an information element, wherein the information element comprises an identifier of the multimedia broadcast service area and an indication that causes at least one terminal device comprised in the at least one cell to request the multimedia broadcast service content as a transmission addressed to the at least one terminal device.

Figure 9:
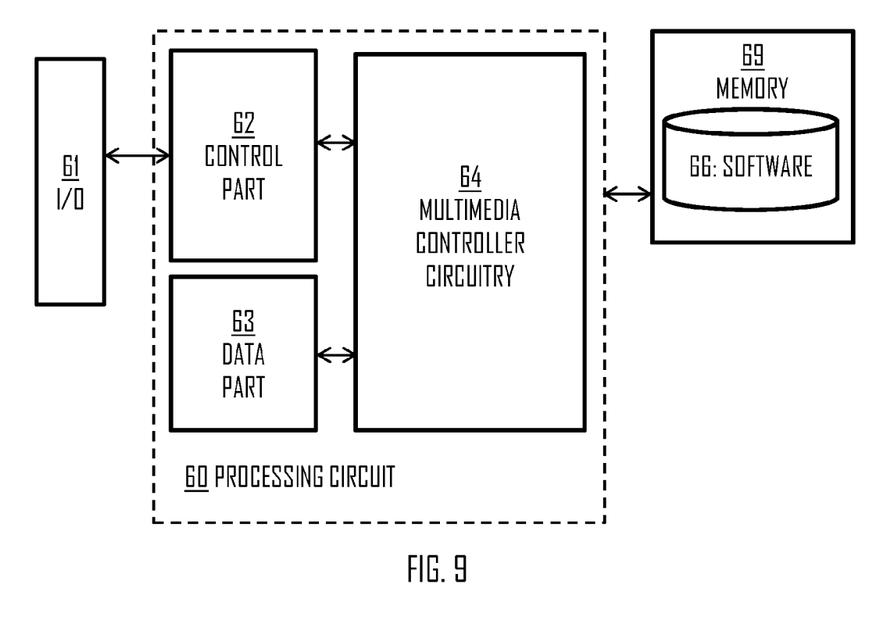
FIGS. 9 and 10 illustrate apparatuses according to some embodiments.

FIG. 9 illustrates an embodiment of an apparatus comprising means for carrying out the above mentioned functionalities of the base station. The base station may comply with specifications of $3^{rd}$ generation partnership project (3GPP) network and/or another wireless network. In an embodiment, the apparatus carrying out the above-described functionalities of the base station is comprised in the base station, e.g. the apparatus may comprise a circuitry, e.g. a chip, a processor, a micro controller, or a combination of such circuitries in the base station.

In an embodiment, the apparatus carrying out the embodiments of the invention in the base station comprises at least one processor and at least one memory including a computer program code, wherein the at least one memory and the computer program code are configured, with the at least one processor, to cause the apparatus to carry out the functionalities of the base station according to any one of the embodiments of FIGS. 2 to 8. Accordingly, the at least one processor, the memory, and the computer program code form processing means for carrying out embodiments of the present invention in the base station.

Referring to FIG. 9, the apparatus may comprise a processing circuit 60 configured to control multimedia transmitting in the base station. The processing circuit 60 may be configured to transmit control information comprising an information element, wherein the information element may comprise an identifier of the MBS area and an indication that may causes at least one terminal device to request the MBS content as a transmission addressed to the terminal device. The processing circuit 60 may be further configured to broadcast a multimedia broadcast transmission comprising the MBS content and to continue broadcasting the multimedia broadcast transmission, while also performing the transmission addressed to the at least one terminal device. The processing circuit 60 may also be configured to identify is the cell provided by the base station an edge cell of the MBS area comprised in the cellular network, transmit multimedia broadcast with a cell identifier and an edge cell indication, receive a request to provide MBS content as a transmission addressed to at least one terminal device and transmit, as a response transmit the MBS content to the at least one terminal device as the transmission addressed to at least one terminal device in the, as described above. The processing circuit 60 may comprise a control part 62 handling multimedia transmission with respect to identifying, transmitting broadcast content, receiving and transmitting transmission addressed to at least one terminal device. The control part 62 may also determine and identify if the cell provided by the base station is a cell in which a transmission addressed to the terminal device shall be requested or an edge cell. The processing circuit 60 may further comprise a data part 63 that handles transmission and reception of multimedia transmission related data when the base station is associated to one or more network device.

The processing circuit 60 may further comprise a multimedia controller circuitry 64 configured to carry out at least some of the above-described embodiments. The multimedia controller circuitry 64 may thus determine what information may be comprised in the multimedia transmission.

The circuitries 62 to 64 of the processing circuit 60 may be carried out by the one or more physical circuitries or processors. In practice, the different circuitries may be realized by different computer program modules. Depending on the specifications and the design of the apparatus, the apparatus may comprise some of the circuitries 62 to 64 or all of them.

The apparatus may further comprise the memory 69 that stores computer programs (software) 66 configuring the apparatus to perform the above-described functionalities of the base station. The memory 69 may also store communication parameters and other information needed for multimedia information exchange, e.g. addresses and other parameters assigned to the base station with respect to different associations.

The apparatus may further comprise radio interface components 61 providing the apparatus with radio communication capabilities within one or more wireless networks. The radio interface components 61 may comprise standard well-known components such as an amplifier, filter, frequency-converter, (de)modulator, and encoder/decoder circuitries and one or more antennas. The apparatus may further comprise a user interface enabling interaction with the user of the base station. The user interface may comprise a display, a keypad or a keyboard, a loudspeaker, etc.

Figure 10:
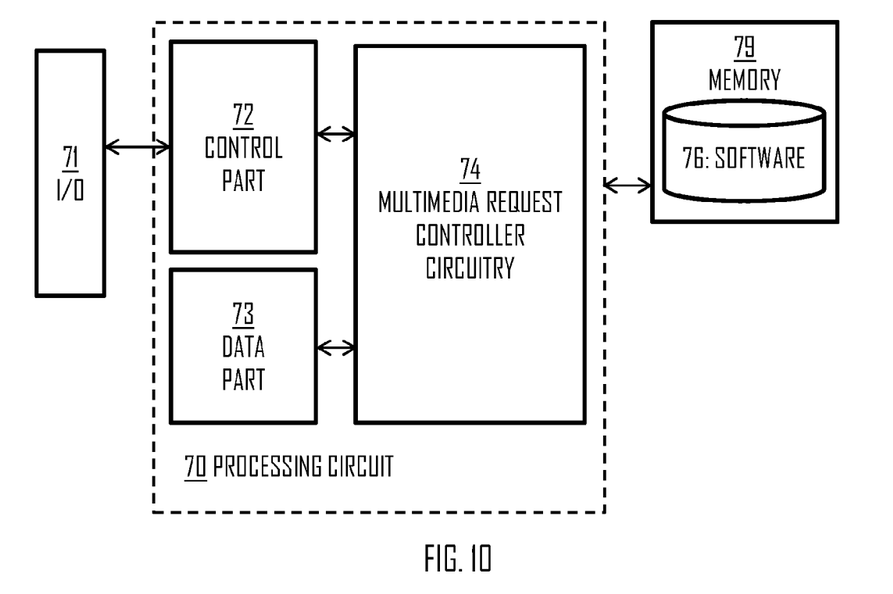

FIG. 10 illustrates an embodiment of an apparatus comprising means for carrying out the above mentioned functionalities of the terminal device. The terminal device may comply with specifications of $3^{rd}$ generation partnership project (3GPP) network and/or another wireless network. In an embodiment, the apparatus carrying out the above-described functionalities of the terminal device is comprised in the terminal device, e.g. the apparatus may comprise a circuitry, e.g. a chip, a processor, a micro controller, or a combination of such circuitries in the terminal device.

In an embodiment, the apparatus carrying out the embodiments of the invention in the terminal device comprises at least one processor and at least one memory including a computer program code, wherein the at least one memory and the computer program code are configured, with the at least one processor, to cause the apparatus to carry out the functionalities of the terminal device according to any one of the embodiments of FIGS. 2 to 8. Accordingly, the at least one processor, the memory, and the computer program code form processing means for carrying out embodiments of the present invention in the terminal device. Referring to FIG. 10, the apparatus may comprise a processing circuit 70 configured to control multimedia receiving in the terminal device. The processing circuit 70 may be configured to receive control information comprising an information element, wherein the information element may comprise an identifier of the MBS area and an indication that causes the terminal device to request the MBS content as a transmission addressed to the terminal device. The processing circuit 70 may further be configured to send in a response to the said indication, a message to at least one base station, wherein the message may comprise a request to start providing the MBS content as a transmission addressed to the terminal device and to receive as a response to the sent message, MBS content to the terminal device as the transmission addressed to the terminal device. The processing circuit 70 may further be configured to receive a multimedia broadcast transmission comprising the MBS content and to continue receiving the multimedia broadcast transmission, before receiving the transmission addressed to the at least one terminal device. The processing circuit 70 may be also be configured to receive a multimedia broadcast with a cell identifier and indication is the cell an edge cell of the MBS area comprised in the cellular network, send a message, to the base station, comprising a request to start providing MBS content as a transmission addressed to the terminal device and receiving the transmission addressed to the terminal device the as described above. The processing circuit 70 may comprise a control part 72 handling multimedia receiving with respect to receiving broadcast, transmitting messages and receiving transmission addressed to the terminal device. The processing circuit 70 may further comprise a data part 73 that handles transmission and reception of multimedia transmission related data when the terminal device is associated to one or more network device.

The processing circuit 70 may further comprise a multimedia request controller circuitry 74 configured to carry out at least some of the above-described embodiments. The multimedia request controller circuitry 74 may thus determine, for example, what information may be comprised in the message request.

The circuitries 72 to 74 of the processing circuit 70 may be carried out by the one or more physical circuitries or processors. In practice, the different circuitries may be realized by different computer program modules. Depending on the specifications and the design of the apparatus, the apparatus may comprise some of the circuitries 72 to 74 or all of them.

The apparatus may further comprise the memory 79 that stores computer programs (software) 76 configuring the apparatus to perform the above-described functionalities of the terminal device. The memory 79 may also store communication parameters and other information needed for multimedia information exchange, e.g. addresses and other parameters assigned to the terminal device with respect to different associations.

The apparatus may further comprise radio interface components 71 providing the apparatus with radio communication capabilities within one or more wireless networks. The radio interface components 71 may comprise standard well-known components such as an amplifier, filter, frequency-converter, (de)modulator, and encoder/decoder circuitries and one or more antennas. The apparatus may further comprise a user interface enabling interaction with the user of the terminal device. The user interface may comprise a display, a keypad or a keyboard, a loudspeaker, etc.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art.

Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

The processes or methods described in FIGS. 2 to 8 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless communication systems defined above but also to other suitable wireless communication systems. The protocols used, the specifications of systems, their network elements and terminal devices, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method of maintaining service continuity in a multimedia broadcast service provided by a cellular network in a multimedia broadcast service area, the method comprising:
    transmitting, by a base station, in at least one cell provided by the base station, control information comprising an information element, wherein the information element comprises an identifier of the multimedia broadcast service area and an indication configured to cause causes at least one terminal device located in the at least one cell to request the multimedia broadcast service content as a transmission addressed to the at least one terminal device.

2. The method of claim 1, further comprising:
    receiving, by the base station, from the at least one terminal device located in the at least one cell a message, wherein the message comprises a request to start providing the multimedia broadcast service content as the transmission addressed to the at least one terminal device; and
    transmitting, by the base station, as response to the received message the multimedia broadcast service content to the at least one terminal device as the transmission addressed to the at least one terminal device.

3. The method of claim 1, further comprising:
    broadcasting, by the base station, in the at least one cell provided by the base station a multimedia broadcast transmission comprising the multimedia broadcast service content.

4. The method of claim 1, further comprising:
    continuing broadcasting the multimedia broadcast transmission, while also performing the transmission addressed to the at least one terminal device.

5. The method of claim 1, wherein the indication configured to cause the at least one terminal device comprised in the at least one cell to request the multimedia broadcast service content as a transmission addressed to the at least one terminal device comprises an indication that the at least one cell is an edge cell of the multimedia broadcast service area.

6. The method of claim 1, wherein the information element comprises a system information block carrying information required to acquire multimedia broadcast service control information associated with one or more multimedia broadcast service areas.

7. The method of claim 1, wherein the indication configured to cause the at least one terminal device comprised in the at least one cell to request the multimedia broadcast service content as a transmission addressed to the at least one terminal device is carried out by setting, in the information element, a multimedia broadcast service control channel allocation to indicate null allocation.

8. An apparatus comprising:
   at least one processor; and
   at least one non-transitory memory including a computer program code, wherein the at least one memory and the computer program code are configured, with the at least one processor, to cause the apparatus to:
   transmit, by the apparatus, in at least one cell provided by the apparatus, control information comprising an information element, wherein the information element comprises an identifier of a multimedia broadcast service area and an indication configured to cause at least one terminal device located in the at least one cell to request a multimedia broadcast service content as a transmission addressed to the at least one terminal device.

9. The apparatus of claim 8, wherein the at least one non-transitory memory and the computer program code are further configured to, with the at least one processor, to cause the apparatus to:
   receive, by the apparatus, from the at least one terminal device located in the at least one cell a message, wherein the message comprises a request to start providing the multimedia broadcast service content as the transmission addressed to the at least one terminal device; and
   transmit, by the apparatus, as response to the received message the multimedia broadcast service content to the at least one terminal device as the transmission addressed to the at least one terminal device.

10. The apparatus of claim 8, wherein the at least one non-transitory memory and the computer program code are further configured to, with the at least one processor, to cause the apparatus to:
    broadcast, by the apparatus, in the at least one cell provided by the apparatus a multimedia broadcast transmission comprising the multimedia broadcast service content.

11. The apparatus of claim 10, wherein the at least one non-transitory memory and the computer program code are further configured to, with the at least one processor, to cause the apparatus to:
    continue broadcasting the multimedia broadcast transmission, while also performing the transmission addressed to the at least one terminal device.

12. The apparatus of claim 8, wherein the indication configured to cause the at least one terminal device comprised in the at least one cell to request the multimedia broadcast service content as a transmission addressed to the at least one terminal device comprises an indication that the at least one cell is an edge cell of the multimedia broadcast service area.

13. The apparatus of claim 8, wherein the information element comprises a system information block carrying information required to acquire multimedia broadcast service control information associated with one or more multimedia broadcast service areas.

14. The apparatus of claim 8, wherein the indication configured to cause the at least one terminal device comprised in the at least one cell to request the multimedia broadcast service content as a transmission addressed to the at least one terminal device is carried out by setting, in the information element, a multimedia broadcast service control channel allocation to indicate null allocation.

15. An apparatus comprising: at least one processor; and at least one non-transitory memory including a computer program code, wherein the at least one memory and the computer program code are configured, with the at least one processor, to cause the apparatus to:
    receive, by the apparatus in the cellular network, control information comprising an information element, wherein the information element comprises an identifier of a multimedia broadcast service area and an indication configured to cause the apparatus to request a multimedia broadcast service content as a transmission addressed to the apparatus.

16. The apparatus of claim 15, wherein the at least one non-transitory memory and the computer program code are further configured to, with the at least one processor, to cause the apparatus to:
    send, by the apparatus in the cellular network in a response to the said indication, a message to at least one base station, wherein the message comprises a request to start providing the multimedia broadcast service content as a transmission addressed to the apparatus; and
    receive, by the apparatus in the cellular network as a response to the sent message, the multimedia broadcast service content as the transmission addressed to the apparatus.

17. The apparatus of claim 15, wherein the at least one non-transitory memory and the computer program code are further configured to, with the at least one processor, to cause the apparatus to:
    receive, by the apparatus in the cellular network, a multimedia broadcast transmission comprising the multimedia broadcast service content.

18. The apparatus of claim 17, wherein the at least one non-transitory memory and the computer program code are further configured to, with the at least one processor, to cause the apparatus to:
    continue receiving the multimedia broadcast transmission, before receiving the transmission addressed to at least one terminal device.

19. The apparatus of claim 15, wherein the indication configured to cause the apparatus to request the multimedia broadcast service content as a transmission addressed to the apparatus comprises an indication that a cell, provided by a base station, in which the apparatus is comprised in is an edge cell of the multimedia broadcast service area.

20. The apparatus of claim 15, wherein the information element is a system information block carrying information required to acquire multimedia broadcast service control information associated with one or more multimedia broadcast service areas.

* * * * *

UNITED STATES PATENT AND TRADEMARK OFFICE
CERTIFICATE OF CORRECTION

PATENT NO. : 10,159,034 B2
APPLICATION NO. : 15/306871
DATED : December 18, 2018
INVENTOR(S) : Henri Markus Koskinen Page 1 of 1

It is certified that error appears in the above-identified patent and that said Letters Patent is hereby corrected as shown below:

In the Claims

In Claim 1:
Column 12, Line 43, "causes" should be deleted.

Signed and Sealed this
Twelfth Day of February, 2019

Andrei Iancu
*Director of the United States Patent and Trademark Office*